Sept. 7, 1937.  E. A. REED  2,092,333
VEHICLE SIGNAL
Original Filed Aug. 26, 1931
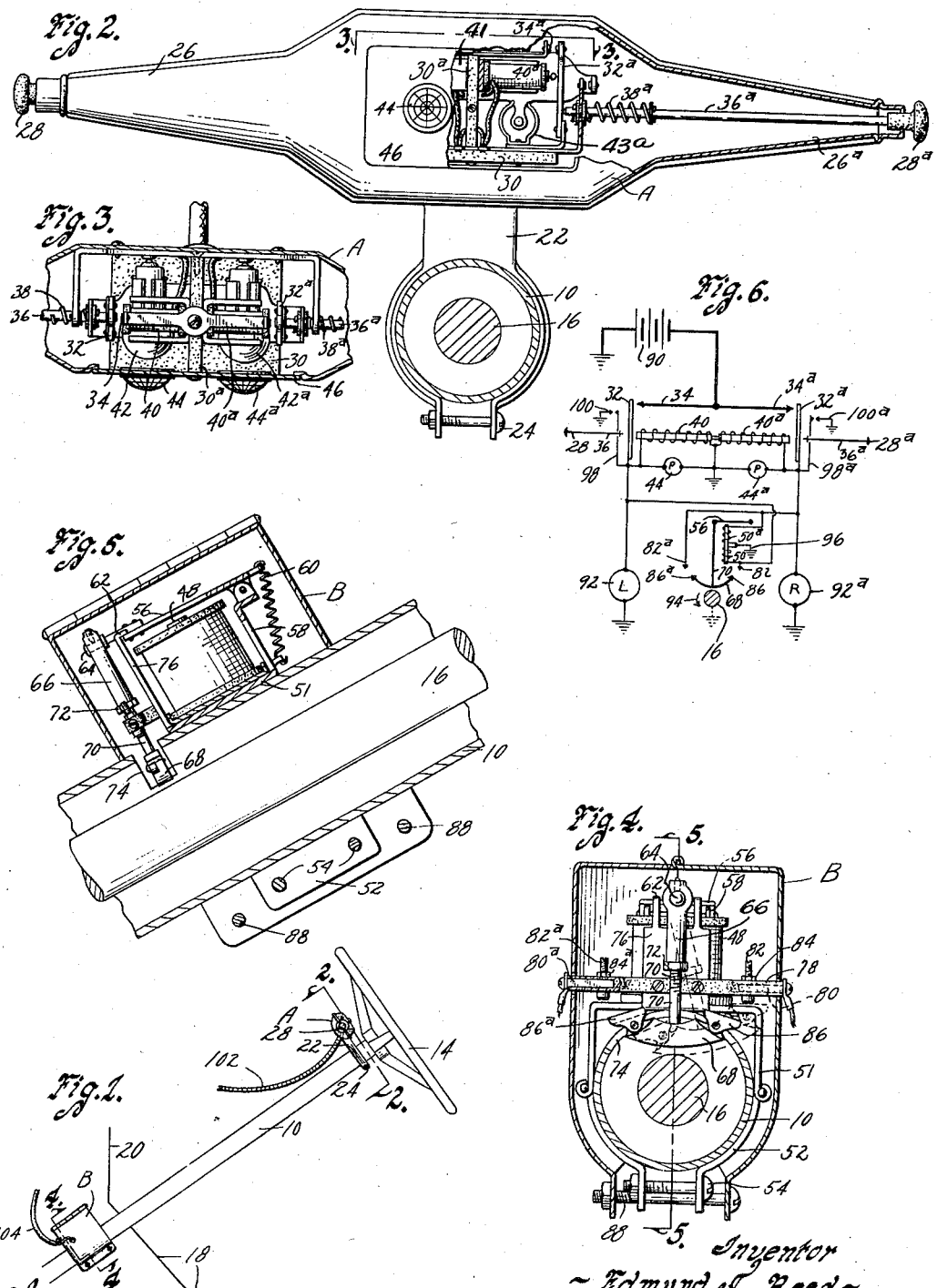
Inventor
~ Edmund A. Reed ~
by Bair, Freeman & Sinclair
Attorneys Patented Sept. 7, 1937

2,092,333

UNITED STATES PATENT OFFICE 2,092,333

VEHICLE SIGNAL

Edmund A. Reed, Des Moines, Iowa

Application August 26, 1931, Serial No. 559,414
Renewed July 6, 1937

14 Claims. (Cl. 177—339)

An object of my invention is to provide an automatic vehicle signal of simple, durable and inexpensive construction.

A further object is to provide a vehicle signal, such as a turn signal for an automobile, which can be energized before the turn is made and which is automatically de-energized after the automobile has turned the corner and commenced to again assume a straight course. In this connection, many signals are now on the market which must either be held in "on" position by one hand of the operator while turning the corner or released before he turns the corner, if he wishes to use both hands in steering his automobile around the corner.

Either way of operating a signal is unsatisfactory and the primary object of my present invention is to make one which will remain in signalling position while the turn is being accomplished and will thereafter automatically return to inoperative position without any attention required from the driver.

A further object is to provide a manually operated switch for causing energization of a signal device, with magnetic means to hold the switch in closed position and automatic means operated from the steering mechanism of the automobile to de-energize the holding means and thereby open the switch after turning the corner.

A further object is to provide an automatic de-energizing means consisting of a shoe or the like frictionally engaging the steering shaft or other movable part of the steering mechanism of the automobile and adapted to engage a stop when the automobile starts to turn in one direction, whereafter slippage occurs as additional steering movement is imparted to the steering mechanism, so that when the steering mechanism starts to move in an opposite direction, the shoe will immediately also start moving in an opposite direction, means being operated by the shoe when moved in such opposite direction to de-energize the signal.

A further object is to provide the de-energizing means in the form of a contact with which the shoe engages, so as to establish a circuit which de-energizes the holding means for the switch, so that the switch will then move to open position.

A further object is to provide means for causing operation of the shoe only when a signal is energized.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a steering column and steering wheel showing my automatic vehicle signal applied thereto. I have shown two separate casings for different parts of the automatic vehicle signal.

Figure 2 is an enlarged sectional view on the line 2—2 of Figure 1 showing one of the parts, which has signal buttons and pilot lights, located adjacent the steering wheel.

Figure 3 is a sectional view on the line 3—3 of Figure 2 showing details of construction.

Figure 4 is an enlarged sectional view on the line 4—4 of Figure 1 showing another part of the signal mechanism.

Figure 5 is a sectional view on the line 5—5 of Figure 4; and

Figure 6 is an electro-diagrammatic figure of the entire signal system.

On the accompanying drawing, I have used the reference numeral 10 to indicate a steering column of an automobile. The steering wheel is indicated at 14, a steering shaft at 16 and floor boards at 18. The dash of the automobile is indicated at 20.

Although my entire mechanism may be inclosed within a single casing, preferably just beneath the steering wheel 14, I have shown it mounted in two casings A and B. The casing A has a bracket or foot 22 which may be clamped to the steering column 10 by a clamping screw 24, as best shown in Figure 2 of the drawing. It is provided with tubular extensions 26 terminating in left and right push buttons 28 and 28a.

Within the casing A, I provide a support 30 of insulation having a portion 30a extending upwardly therefrom. Switch arms 32 and 32a extend upwardly from the support 30 and are normally constrained to the position shown in Figure 2. The switch arms 32 and 32a are adapted to engage contact members 34 and 34a upon being pushed inwardly by thrust rods 36 and 36a against the action of springs 38 and 38a. The thrust rods 36 and 36a are connected with the push buttons 28 and 28a, respectively.

Holding magnets 40 and 40a are provided for holding the switch arms 32 and 32a in closed circuit positions when moved to such positions by the push buttons 28 and 28a. Pilot lights 42 and 42a are mounted within the casing A and indicate when the switch arms 32 and 32a are in closed positions. The pilot lights 42 and 42a can be seen through colored lenses 44 and 44a, which are mounted in a closure panel 46.

Within the casing B I provide a magnet core 48 wound with magnet coils 50 and 50a. The core 48 is supported on a bracket 51 having hinged clamp arms 52 and a clamp bolt 54 for clamping the bracket on the steering column 10. The arms 52, being hinged, provide for ready connection of the bracket 51 to various diameters of steering columns.

An armature 56 is provided for the magnet core 48 and is pivoted to a bracket 58. It is constrained toward movement in a direction away from the magnet core by a spring 60 and is limited as to such movement by stop fingers 62. The armature 56 has a stub shaft 64 on which is journalled an arm 66. The arm 66 carries a shoe 68 by means of an adjusting rod 70 screw-threaded into the arm 66. A lock nut 72 is provided for retaining the parts 66 and 70 in adjusted positions relative to each other. The arm 66 normally hangs in the position shown in Figure 4 because of gravity.

A slot 74 is cut in the steering column 10 to accommodate the shoe 68 so that it can engage with the steering shaft 16 whenever either magnet coil 50 or 50a is energized. The slot 74 may be cut with a hack saw or similar tool.

The stop fingers 62 are formed on a bracket 76 to which is secured an insulating bar 78. Metal inserts 80 and 80a extend into the ends of the bar 78 and contact screws 82 and 82a extend through the bar and the inserts. Lock nuts 84 and 84a are provided on the contact screws 82 and 82a whereby they may be adjusted.

The shoe 68 is provided with contacts 86 and 86a which may be rocked for aligning them with the lower faces of the contacts 82 and 82a with which they engage during the operation of the device. It will be obvious that the shoe 68 can be adjusted by rotating the rod 70 relative to the arm 66 for smaller or larger steering shafts 16.

The contacts 82 and 82a may be adjusted for sooner or later contact, as desired.

*Practical operation*

In the operation of my automatic vehicle signal, let us first assume that the driver of the automobile wishes to turn to the left. He presses the push button 28 which causes operation of the signal system, as best illustrated in the diagrammatic Figure 6. In this figure, a source of current supply, such as the storage battery of the automobile, is indicated at 90. It is connected with the contacts 86 and 86a. When the push button is pushed, it causes the switch arm 32 to engage the contact 34 for feeding current to the coil of the holding magnet 40, the pilot light 44, the magnet coil 50 surrounding the magnet core 48 and a left turn signal light 92. When the button 28 is released, the spring 38 will return it to its normal position, but the switch arm 32 will remain in closed circuit position because of the holding power of the magnet 40.

The driver then turns the steering shaft 16 in the direction of the arrow 94 to make a left turn. Since the coil 50 is energized, the shoe 68 frictionally engages the steering shaft 16 so that the shoe will swing in a left hand direction until the end 86a thereof engages the contact 82a which will act as a stop. Further steering movement of the shaft 16 in the direction of the arrow 94 will cause it to slip past the shoe 68. Engagement of the contacts 82a and 86a will not affect the signal circuit because the contact 82a is connected with the switch arm 32a which is in open circuit position.

After the corner has been turned and the driver starts to straighten up his car, the shoe 68 will immediately swing toward the right until contact 86 engages contact 82 whereafter slippage will occur. Such engagement causes current from the switch arm 32 to be shunted past the holding magnet 40, pilot light 44, signal light 92 and the coil 50. The shunted current passes through the contacts 82 and 86 and the shoe 68 to the steering shaft 16 which is inherently grounded. The path of the current is then direct from the switch arm 32 to the ground. This robs the holding magnet 40 of current whereupon it immediately releases the switch arm 32 which returns to open position, thus automatically opening the directly grounded circuit through the shoe 68 soon after the driver starts to straighten out his car.

Upon desiring to turn to the right, the right hand push button 28a is pressed and the operation of the device is similar except instead of the parts just mentioned, their similar parts, which have the addition of the characteristic *a* added to the reference numeral, will be operated. Thus it will be seen that I have provided a signal system which can be manually put into operation, but will automatically return to inoperative position without any attention on the part of the driver and will so return at the desired time, that is—after the corner has been completely turned.

If desired, the driver can render either the left or right signal inoperative by pulling on the buttons 28 or 28a, respectively. This is accomplished by mounting the thrust rods 36 and 36a in switch arms 98 and 98a which are adapted to engage with grounded contacts 100 and 100a upon pulling outward of the push buttons.

The switch arms 98 and 98a manually accomplish the same result of grounding the switch arms 32 and 32a as the shoe 68 does during its automatic operation. The various wires from the casing A may be housed in a cable 102 and likewise the wires from the inserts 80 and 80a and the magnet coils 50 and 50a may be housed in a cable 104. The magnet coils 50 and 50a may be eliminated and spring means provided for causing constant engagement between the shoe 68 and the steering shaft 16, if desired. The shoe 68 may contact with any movable portion of the steering mechanism and may be located at any desirable position. It may, for instance, be combined with the housing A and still accomplish the same result of automatic de-energization of the signals.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:

1. In a device of the class described, a vehicle having steering mechanism, a signal therefor, a source of current supply therefor, a switch for establishing a circuit through said source of current supply and said signal, means energized from said circuit to maintain said switch in closed position, a movable member, means actuated by the closing of said switch to cause operative connection of said movable member with said steering mechanism for movement in one direction thereby and then movement in an opposite direction thereby and a contact with which said movable member engages when moved in such opposite direction, said contact being connected with said first means to shunt it upon such engagement occurring.

2. In a device of the class described, a vehicle having steering mechanism, a signal therefor, a source of current supply for said signal, a switch for establishing a circuit through said source of current supply and said signal, means energized from said circuit to maintain said switch in closed position, a movable member, means actuated by the closing of said switch to cause operative connection of said movable member with said steering mechanism for movement in one direction and then in an opposite direction thereby and a contact with which said movable member engages when moved in such opposite direction, said contact being connected with said first means to cause substantial weakening of the energization thereof upon such engagement occurring to thereby open said switch and with said second means to shunt it and thereby discontinue the operative connection between the movable member and the steering mechanism.

3. In a device of the class described, a vehicle having steering mechanism, a signal therefor, a source of current supply for said signal, a switch for establishing a circuit through said source of current supply and said signal, means energized from said circuit to maintain said switch in closed position, a movable member, means actuated by the closing of said switch to cause operative connection of said movable member with said steering mechanism for movement in one direction and then in an opposite direction thereby and a contact with which said movable member engages when moved in such opposite direction, said contact being connected with said first and second means to cause substantial weakening of the energization thereof upon such engagement occurring to thereby open said switch and to discontinue the operative connection between the movable member and the steering mechanism respectively.

4. In a device of the class described, a source of current supply, a vehicle having steering mechanism, a pair of signals therefor, a pair of switches, current conductors connecting said current supply, switches and signals, each of said switches establishing a circuit through said source of current supply and through one of said signals, a movable member engageable with said steering mechanism for being moved thereby when said movable member is moved to one position, electro-responsive means for said switches to hold the circuit closed which was established by closure of one thereof and for moving said movable member to said one position upon closure of said circuits and contacts for said movable member to engage successively as the movable member is moved first in one direction and then in an opposite direction, said contacts being connected each with one of said electroresponsive means to cause opening of a closed one of said switches upon the second engagement occurring.

5. In a device of the class described, a source of current supply, a vehicle having steering mechanism, a plurality of signals therefor, a plurality of switches, current conductors connecting said current supply, switches and signals each of said switches establishing a circuit through said source of current supply and through one of said signals, a movable member for frictional engagement with said steering mechanism for being moved thereby when said movable member is moved to one position, electro-magnetic means for said switches to hold the circuit closed which was established by closure of one of said switches and for moving said movable member to said one position, said electromagnetic means responding to said circuit when closed, and contacts for said movable member to engage successively as the movable member is moved first in one direction and then in an opposite direction, said contacts being connected with said electromagnetic means for weakening the current supplied thereto and thereby opening a closed one of said switches, all upon the second engagement occurring.

6. In a device of the class described, a vehicle having steering mechanism, a signal therefor, a source of current supply for said signal, a switch, conductors connecting said signal, source of current supply and switch, said switch, upon closure thereof, establishing a circuit through said source of current supply and said signal, means energized from said circuit to maintain said circuit closed, a movable member, an electroresponsive device operatively connected therewith to move said movable member into operative connection with said steering mechanism when said electroresponsive device is energized, said movable member thereupon being moved in one direction by said steering mechanism when it moves in one direction and then being moved in an opposite direction by said steering mechanism when it moves in an opposite direction, and a contact with which said movable member engages when moved in said opposite direction, said contact being connected with said first means to shunt it upon said engagement occurring.

7. In a device of the class described, a vehicle having steering mechanism, a source of current supply, a signal for said vehicle, a switch, conductors connecting said signal, source of current supply and switch, said switch, upon closure thereof, establishing a circuit through said source of current supply and said signal, electro-responsive means for maintaining said circuit closed, a movable member, an electro-responsive device for moving it into engagement with said steering mechanism, when said electro-responsive device is energized, whereby the movable member is moved by said steering mechanism upon its movement, and means engaged by said movable member after said steering mechanism moves in one direction and then a predetermined distance in an opposite direction to shunt said electro-responsive means and thereby open said switch.

8. In a device of the class described, a source of current supply, a vehicle having steering mechanism, a signal therefor, a normally open switch, current conductors connecting said current supply, signal, and switch, said switch establishing a circuit through said source of current supply and said signal upon closure thereof, a movable member, electro-responsive means for maintaining said circuit closed and for moving said movable member to cause it to operatively engage said steering mechanism and thereby respond to movement thereof, said electro-responsive means being responsive to energization of said circuit and a contact engageable with said movable member only after said steering mechanism moves in one direction and when it then moves in a return direction, said contact being connected with said source of current supply to shunt it around the electroresponsive means and thereby reduce energization thereof to an extent permitting said circuit to open when the movable member engages the contact.

9. In a device of the class described, a vehicle having steering mechanism, a signal therefor, a source of current supply therefor, a switch, conductors connecting said signal, source of current supply and switch, said switch, upon closure thereof, establishing a circuit through said source of current supply and said signal, means energized from said circuit to maintain said circuit closed, a movable member, means actuated by the closing of said circuit to cause operative connection of said movable member with said steering mechanism for movement in one direction thereby and then movement in an opposite direction thereby, and a contact with which said movable member engages when moved in such opposite direction, said contact being connected with said first means to shunt it upon such engagement occurring.

10. In a device of the class described, a vehicle having steering mechanism, a signal therefor, a source of current supply for said signal, a switch, conductors connecting said signal, source of current supply and switch, said switch, upon closure thereof, establishing a circuit through said source of current supply and said signal, means energized from said circuit to maintain said circuit closed, a movable member, means actuated by the closing of said switch to cause operative connection of said movable member with said steering mechanism for movement in one direction and then in an opposite direction thereby and a contact with which said movable member engages when moved in such opposite direction, said contact being connected with said first means to cause substantial weakening of the energization thereof upon such engagement occurring to thereby open said circuit, and with said second means to shunt it and thereby discontinue the operative connection between the movable member and the steering mechanism.

11. In a device of the class described, a vehicle having steering mechanism, a signal therefor, a source of current supply for said signal, a switch, conductors connecting said signal, source of current supply and switch, said switch, upon closure thereof, establishing a circuit through said source of current supply and said signal, means energized from said circuit to maintain said circuit closed, a movable member, means actuated by the closing of said switch to cause operative connection of said movable member with said steering mechanism for movement in one direction and then in an opposite direction thereby and a contact with which said movable member engages when moved in such opposite direction, said contact being connected with said first and second means to cause substantial weakening of the energization thereof upon such engagement occurring to thereby open said circuit and to discontinue the operative connection between the movable member and the steering mechanism respectively.

12. In a device of the class described, a vehicle having steering mechanism, a signal therefor, a source of current supply therefor, a switch, conductors connecting said signal, source of current supply and switch, said switch, upon closure thereof, establishing a circuit through said source of current supply and said signal, means energized from said circuit to maintain said circuit closed, a movable member, an arm pivoted thereto, a shoe carried by said arm, means actuated by the closing of said switch to cause movement of said movable member and thereby operative engagement of said shoe with said steering mechanism for movement in one direction thereby and then movement in an opposite direction thereby, and a contact with which said shoe engages when moved in such opposite direction, said contact being connected with said first means to shunt it upon such engagement occurring.

13. In a device of the class described, a vehicle having steering mechanism, a signal therefor, a source of current supply for said signal, a switch, conductors connecting said signal, source of current supply and switch, said switch, upon closure thereof, establishing a circuit through said source of current supply and said signal, means energized from said circuit to maintain said circuit closed, a movable member, an arm pivoted thereto, a shoe carried by said arm, means actuated by the closing of said switch to cause movement of said movable member and thereby operative engagement of said shoe with said steering mechanism for movement in one direction and then in an opposite direction, thereby, and a contact with which said shoe engages when moved in such opposite direction, said contact being connected with said first means to cause substantial weakening of the energization thereof upon such engagement occurring to thereby open said circuit and with said second means to shunt it and thereby discontinue the operative connection between said shoe and the steering mechanism.

14. In a device of the class described, a vehicle having steering mechanism, a signal therefor, a source of current supply for said signal, a switch, conductors connecting said signal, source of current supply and switch, said switch, upon closure thereof, establishing a circuit through said source of current supply and said signal, means energized from said circuit to maintain said circuit closed, a movable member, an arm pivoted thereto, a shoe carried by said arm, means actuated by the closing of said switch to cause movement of said movable member and thereby operative engagement of said shoe with said steering mechanism for movement in one direction and then in an opposite direction, thereby, and a contact with which said shoe engages when moved in such opposite direction, said contact being connected with said first and second means to cause substantial weakening of the energization thereof upon such engagement occurring to thereby open said circuit and to discontinue the operative connection between said shoe and the steering mechanism respectively.

EDMUND A. REED.